United States Patent
Xue et al.

(10) Patent No.: US 7,509,748 B2
(45) Date of Patent: Mar. 31, 2009

(54) MAGNETIC MEMS SENSORS

(75) Inventors: Song Xue, Edina, MN (US); Patrick Ryan, Saint Paul, MN (US); Nurul Amin, Woodbury, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 159 days.

(21) Appl. No.: 11/514,793

(22) Filed: Sep. 1, 2006

(65) Prior Publication Data

US 2008/0052932 A1    Mar. 6, 2008

(51) Int. Cl.
G01C 17/38    (2006.01)
(52) U.S. Cl. ...................... 33/356; 33/355 R
(58) Field of Classification Search .......... 33/356, 33/355 R, 355 D, 357
See application file for complete search history.

(56) References Cited

U.S. PATENT DOCUMENTS

| | | | |
|---|---|---|---|
| 5,101,669 A | | 4/1992 | Holm-Kennedy |
| 5,856,895 A | | 1/1999 | Schaenzer |
| 6,079,088 A | | 6/2000 | Schaenzer |
| 6,318,176 B1 | | 11/2001 | McKenzie |
| 6,433,533 B1 * | | 8/2002 | Clymer et al. .............. 324/166 |
| 6,629,448 B1 | | 10/2003 | Cvancara |
| 6,722,206 B2 * | | 4/2004 | Takada ........................ 73/779 |
| 6,747,449 B1 * | | 6/2004 | Maylin et al. ................ 324/247 |
| 6,861,838 B2 * | | 3/2005 | Kawase ...................... 324/249 |
| 7,069,145 B2 * | | 6/2006 | Jendbro et al. .............. 701/207 |
| 7,077,010 B2 | | 7/2006 | Ganapathi |
| 7,119,533 B2 * | | 10/2006 | Tamura et al. .............. 324/202 |
| 7,126,330 B2 * | | 10/2006 | Peczalski et al. ............ 324/247 |
| 7,145,321 B2 * | | 12/2006 | Sandquist et al. ....... 324/117 R |
| 7,149,627 B2 * | | 12/2006 | Ockerse et al. .............. 701/224 |
| 7,210,236 B2 * | | 5/2007 | Sato et al. .................... 33/356 |
| 7,266,452 B2 * | | 9/2007 | Ockerse et al. .............. 701/224 |
| 7,278,219 B2 * | | 10/2007 | Honkura et al. .............. 33/356 |
| 7,298,140 B2 * | | 11/2007 | Honkura et al. ............. 324/249 |
| 7,358,722 B2 * | | 4/2008 | Peczalski et al. ............ 324/247 |
| 7,375,515 B2 * | | 5/2008 | Omagari et al. ............. 324/249 |
| 7,379,814 B2 * | | 5/2008 | Ockerse et al. ................ 33/361 |
| 2003/0030527 A1 | | 2/2003 | Mhani |
| 2005/0145029 A1 | | 7/2005 | Stewart |
| 2005/0242805 A1 * | | 11/2005 | Honkura et al. ............. 324/249 |

(Continued)

FOREIGN PATENT DOCUMENTS

WO    WO 01/27638 A1    4/2001

OTHER PUBLICATIONS

Melexis Microelectronic Systems, Hall Applications Guide, 1997.

*Primary Examiner*—Yaritza Guadalupe-McCall

(57) ABSTRACT

The disclosure relates to micro-electromechanical systems (MEMS) and magnetic MEMS sensors. The sensors include a substrate having a surface, a first magnetic field detector positioned on the surface, a second magnetic field detector positioned on the surface proximate to the first magnetic field detector, and a third magnetic field detector positioned on the surface proximate to the first and second magnetic field detectors. Each of the first, second and third magnetic field detector is capable of detecting external magnetic fields that are mutually orthogonal along three directions. In certain embodiments, the magnetic MEMS sensors may be useful as electronic compasses. The disclosure also relates to fabricating a magnetic MEMS device, such as an electronic compass, from or on a single wafer, which includes multiple MEMS sensors.

22 Claims, 6 Drawing Sheets

U.S. PATENT DOCUMENTS

| | | | |
|---|---|---|---|
| 2005/0246099 A1* | 11/2005 | Jendbro et al. | 701/216 |
| 2005/0283988 A1* | 12/2005 | Sato et al. | 33/356 |
| 2006/0066295 A1* | 3/2006 | Tamura et al. | 324/202 |
| 2006/0247847 A1* | 11/2006 | Carter et al. | 701/200 |
| 2007/0124076 A1* | 5/2007 | Ockerse et al. | 701/224 |
| 2007/0288166 A1* | 12/2007 | Ockerse et al. | 33/361 |
| 2008/0042973 A1* | 2/2008 | Zhao et al. | 345/156 |
| 2008/0052931 A1* | 3/2008 | Kwon et al. | 33/335 R |
| 2008/0143329 A1* | 6/2008 | Ishihara | 324/251 |

* cited by examiner

MAGNETIC MEMS SENSORS

TECHNICAL FIELD

The disclosure relates to micro-electro-mechanical systems (MEMS) and electronic devices, particularly magnetic MEMS sensors such as electronic compasses. The disclosure also relates to methods for fabricating magnetic MEMS sensors.

BACKGROUND

Electronic sensors for determining the direction of an external magnetic field are well known in the art in a variety of contexts. One particularly important use of such sensors is to determine the orientation of the sensor with respect to the magnetic field of the earth. When such a sensor is employed in this way it is often called an electronic compass. Electronic compasses have been developed using one or more magnetic fluxgates to sense the external magnetic field. The basic fluxgate compass is an electromagnetic sensor that employs two or more small coils of wire wrapped around a core of non-linear magnetic material to directly sense the horizontal component of the earth's magnetic field.

Electronic compasses have numerous advantages over conventional mechanical compasses utilizing a piece of magnetized metal to indicate direction. One such advantage is that an electronic compass may be made much smaller in size than a magnetized metal mechanical compass. Another advantage is that electronic compasses are not affected by acceleration or deceleration of a vehicle in which the compass is carried. An additional advantage is that an electronic compass provides an electrical output allowing a simple interface with other electronic circuitry such as an electronic navigation system or an autopilot.

The electrical output may, for example, be digitized and visually displayed. The digitized directional reading may be electronically compensated to correct for directional errors due to surrounding ferrous metal and nearby magnetic emissions sources such as iron-bearing ores present in natural geological formations. If multiple fluxgate detectors are used in a fluxgate array, the digitized output may also be corrected for magnetic variation resulting from the earth's magnetic field dipping downward toward the poles, or for magnetic deviation, that is, the difference between true north and magnetic north, which is a function of longitude, latitude, elevation and date.

To avoid directional inaccuracies created by the vertical component of the earth's magnetic field, a fluxgate array must be kept as flat as possible by mounting it on gimbals or using a fluid suspension system. Nevertheless, inertial errors are inevitable when the compass is turning sharply or rolled from side to side. Such roll and heel-induced errors often plague fluxgate compasses installed on watercraft and vehicles designed to operate over rough terrain. Another disadvantage of fluxgate detector arrays is that such systems depend on the individual fluxgate sensors having substantially identical operating characteristics if the output of the sensors is to be used directly without substantial additional signal processing to correct for differences in such operating characteristics. Typical fluxgate detector fabrication processes do not produce such uniform sensors, however.

It is desirable to provide a low cost, easy to make and use, and enhanced sensitivity magnetic field sensor. It would also be highly desirable to fabricate a compass that does not exhibit the deficiencies associated with known flux-gate compasses. It would thus be highly desirable to fabricate a MEMS compass on a single wafer.

SUMMARY

In general, the invention relates to micro-electro-mechanical systems, electronic devices and sensors. In certain aspects, the invention relates to magnetic MEMS sensors, for example, magnetic field sensors such as compasses.

In some embodiments, the invention relates to a magnetic field sensor. The sensor comprises a substrate having a surface, a first magneto-impedance magnetic field detector positioned on the surface, a second magneto-impedance magnetic field detector positioned on the surface proximate to the first magneto-impedance magnetic field detector, and a third magnetic field detector positioned on the surface proximate to the first and second magneto-impedance magnetic field detectors, wherein each of the first, second and third magnetic field detector are capable of detecting external magnetic fields that are mutually orthogonal along three directions.

In certain exemplary embodiments, the invention relates to a magnetic compass. The compass comprises a substrate having a first, second, third and fourth surface, wherein the first and second surface are substantially parallel and the third and fourth surface are each sloped relative to the first and second surface, a first magnetic field detector positioned on the second surface, a second magnetic field detector positioned on the third surface, and a third magnetic field detector positioned on the fourth surface proximate to and substantially orthogonal to both the first and second magnetic field detectors, wherein each of the first, second and third magnetic field detector is capable of detecting external magnetic fields that are mutually orthogonal along three directions.

In still other embodiments, the invention relates to a three-dimensional compass. The three-dimensional compass comprises a base having a surface oriented relative to an external magnetic field, a structure formed on the surface, wherein the structure comprises a plurality of side faces, wherein each side face defines an acute angle relative to line drawn normal to the surface, and wherein each side face converges to an apex defining a generally substantially planar plateau substantially parallel to the surface, a first magneto-impedance magnetic field detector positioned on the plateau, a second magneto-impedance magnetic field detector positioned on one of the side faces, wherein the second magneto-impedance magnetic field detector is positioned substantially orthogonal to the first magneto-impedance magnetic field detector, a third magnetic field detector positioned on one of the side faces, wherein the third magnetic field detector is positioned substantially orthogonal to both the first and second magneto-impedance magnetic field detectors, wherein each of the first, second and third magnetic field detector are capable of detecting external magnetic fields that are mutually orthogonal along three directions.

In additional embodiments, the invention relates to a method of making a magnetic compass. The method of making a compass comprises providing a substrate, fabricating from the substrate a first, second and third magnetic field detector, wherein each of the first, second and third magnetic field detector is capable of detecting external magnetic fields that are mutually orthogonal along three directions.

BRIEF DESCRIPTION OF DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

The present invention relates generally to magnetic MEMS sensors, and particularly to magnetic field sensors such as magnetic MEMS compasses. A number of MEMS magnetic field sensors can be prepared according to various embodiments of the present invention. Generally, sensor structures can be classified according to the number of independent directional axes for which the sensor can simultaneously detect a change in displacement or force. Single (one) axis sensors can generally detect a change in magnetic field strength or direction relative to an external magnetic field in only one dimension or direction. Multi-dimensional sensors according to certain embodiments of the present invention may simultaneously detect a change in magnetic field strength or direction relative to an external magnetic in more than one dimension or direction.

MEMS magnetic field sensors according to some embodiments of the present invention include one or more magnetic field detection elements. Various functional elements may be used to provide a magnetic field detection element. Preferably, the magnetic field detection element is selected from a magneto-electric, magneto-resistive, magneto-impedance, magneto-strictive, flux guided magneto-resistive, giant magneto-impedance (GMI), giant magneto-electric (GME), giant magneto-resistive (GMR) or tunneling-magneto-resistive (TMR) detector.

Certain exemplary embodiments make use of one or more GMI detectors. A GMI detector generally includes a core, which includes a wire (comprising, for example, a conductive metal) and a clad layer (comprising, for example, soft ferromagnetic material). A coil is deposited around the core. When a high frequency alternating current is passed through the wire, the resistive component of the electrical impedance changes enormously in the presence of very small external magnetic fields. Because a change in resistance can be measured very accurately, this leads to extraordinary sensitivity to external magnetic fields. Those skilled in the art recognize that other GMI detector structures can be utilized without departing from the present invention.

The present invention will now be described, by way of example, with reference to the accompanying drawings. It will be understood that certain features, shapes and positions of elements depicted in the figures can be altered or varied without conflicting with or deviating from the scope of the presently disclosed invention.

Figure 1:
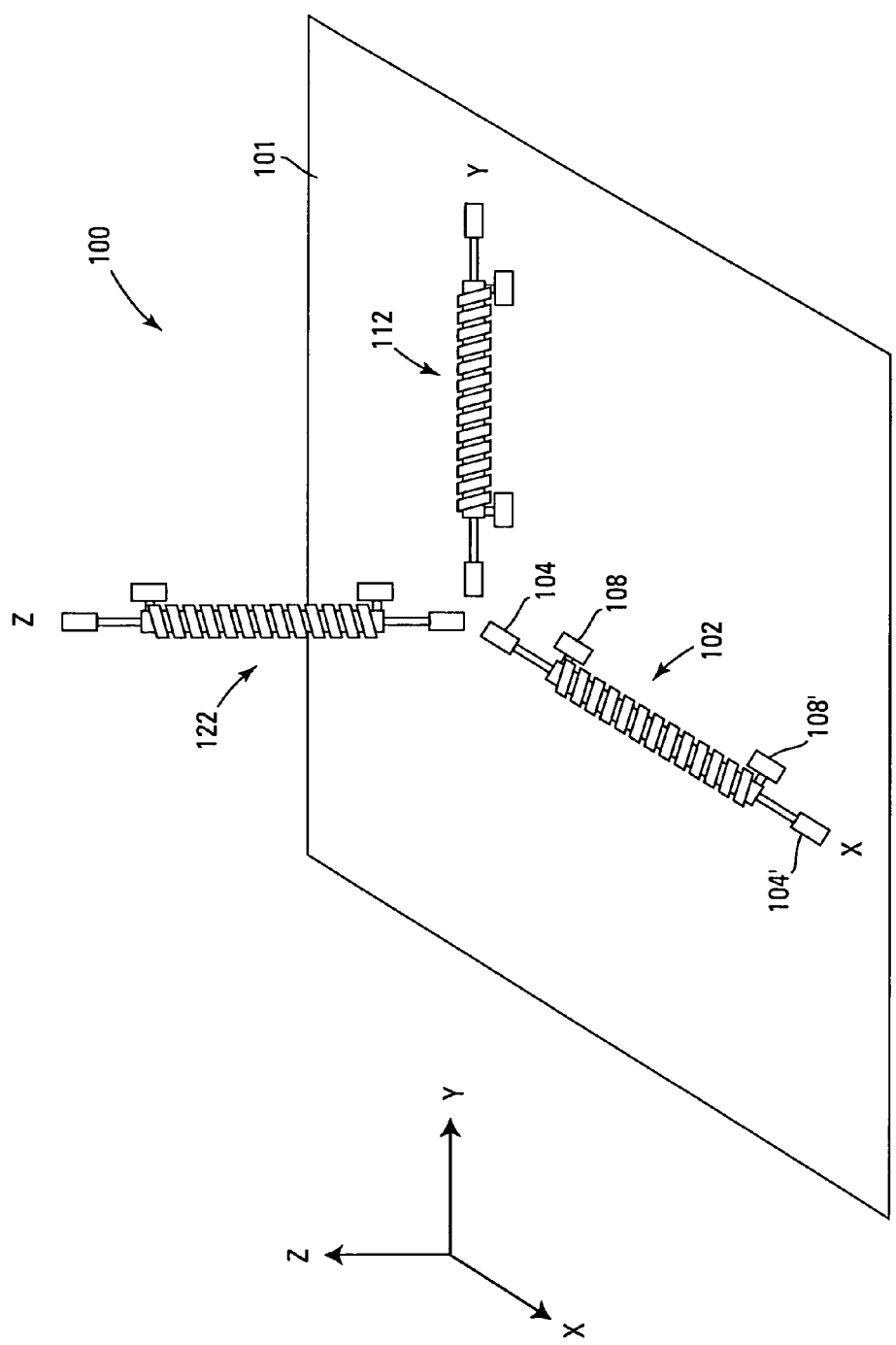
FIG. 1 is a schematic view diagram illustrating an exemplary three axis magnetic MEMS compass using three giant magneto-impedance (GMI) magnetic field detectors according to an embodiment of the present invention.

Turning now to the figures, FIG. 1 illustrates a three-axis magnetic field sensor 100 having three giant magneto-impedance (GMI) magnetic field detectors formed on a substrate 101 according to one embodiment of the present invention. A first GMI magnetic field detector 102, including a coil 106 about a core 103, is shown positioned on a substrate 101 relative to an external magnetic field in a direction corresponding to a first axial direction (for example, in an x-axis direction in a Cartesian coordinate system as illustrated in FIG. 1). The core 103 includes first and second electrical contacts 104 and 104', and the coil 106 includes first and second electrical contacts 108 and 108'. The electrical contacts 104 and 104' may each be connected to one of the positive or negative contacts of a source of high frequency alternating current (for example, a high frequency AC power supply not shown in FIG. 1), and the electrical sensing contacts 108 and 108' may each be connected to a electrical circuit (not shown in FIG. 1) for measuring the resistive component of the electrical impedance of the ferromagnetic core 103.

A second GMI magnetic field detector 112, with a structure similar to GMI magnetic field detector 102, is shown positioned on the substrate 101 relative to the external magnetic field in a direction corresponding to a second axial direction (for example, in a y-axis direction in a Cartesian coordinate system as illustrated in FIG. 1).

A third magnetic field detector 122, with a structure similar to GMI magnetic field detectors 102 and 112, is shown positioned on the substrate 101 relative to an external magnetic field in a direction corresponding to a third axial direction (for example, in a z-axis direction in a Cartesian coordinate system as illustrated in FIG. 1).

Alternatively, the third magnetic field detector 122 may be a different type of magnetic field detector not illustrated in FIG. 1, such as, for example, a magneto-electric sensor, a magneto-resistive sensor, a magneto-impedance sensor, a magneto-strictive sensor, a flux guided magneto-resistive sensor, a giant magneto-resistive sensor, a giant magneto-electric sensor, a giant magneto-impedance sensor, a tunneling giant magneto-resistive sensor or an anisotropic magneto-resistive sensor. The third magnetic field detector 122 may, in certain alternative embodiments, comprise one or more pancake coils, or one or more coils that extend in a single plane (shown in FIGS. 2, 3, and 4).

Preferably, the three magnetic field detectors 102, 112 and 122 are oriented substantially orthogonal to each other, with GMI magnetic field detectors 102 and 112 positioned on a substantially planar substrate surface (not shown in FIG. 1) defined by the x-axis and the y-axis directions of the external magnetic field as shown in FIG. 1. Preferably, the third magnetic field detector 122 is positioned substantially orthogonal to the first and second GMI detectors 102 and 112, such that the third magnetic field detector 122 is oriented in substantially the same direction as the z-axis direction as shown in FIG. 1.

As shown in FIG. 1, magnetic field detector 122 may extend outward from the substantially planar substrate surface in a direction generally orthogonal to the surface (i.e. in the z-axis direction of FIG. 1). However, fabrication of a GMI magnetic field detector extending out of a substrate surface may present some difficulty, as it may require a large number of steps in a wafer fabrication process to produce a coil 126 extending in the z-axis direction. Accordingly, in some embodiments, it is preferred to use one or more GMI detectors utilizing pancake coil(s) as a magnetic field detector for sensing a magnetic field in a direction corresponding to the z-axis direction extending outward from the substrate surface.

Figure 2:
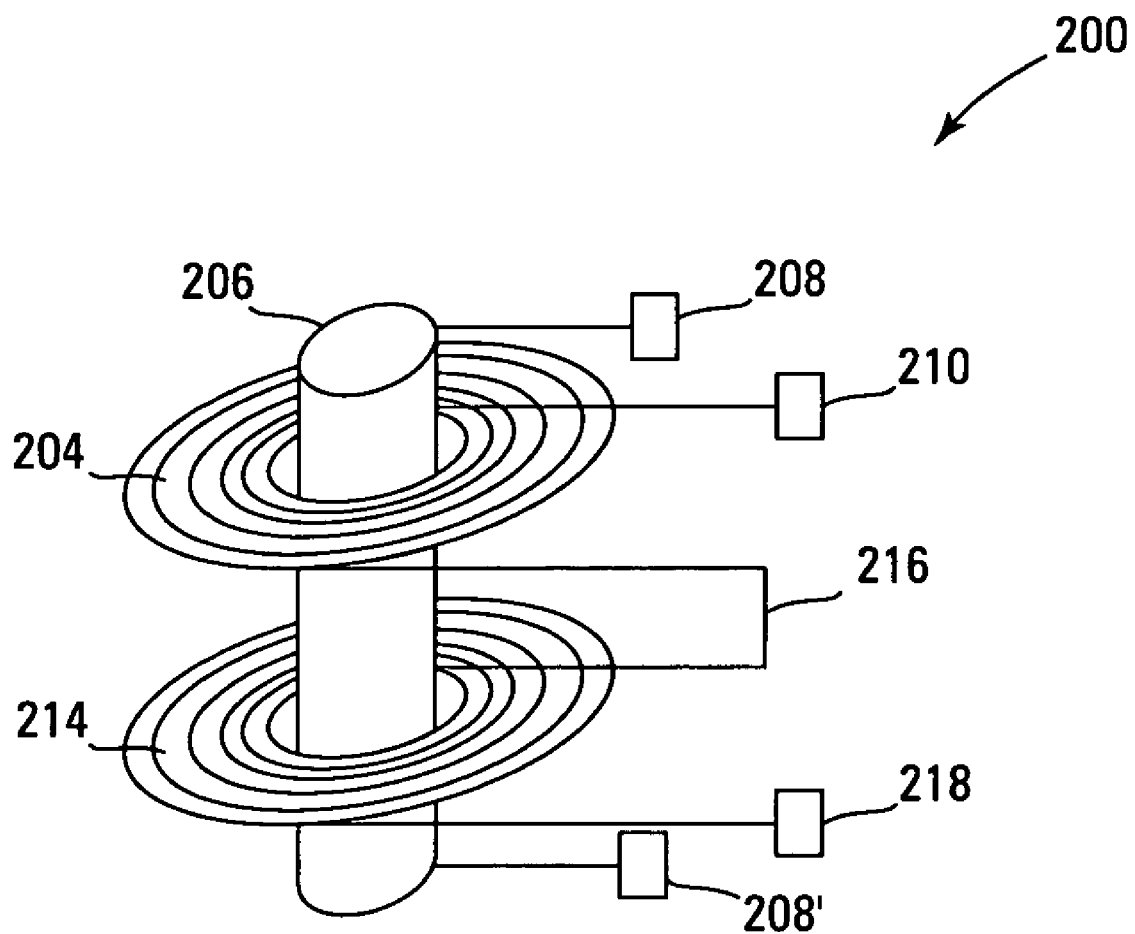
FIG. 2 is a schematic view diagram illustrating an exemplary magnetic MEMS detector, including two vertically stacked substantially planar pancake coils that may be used to replace one or more of the GMI magnetic field detectors of FIG. 1 according to another embodiment of the present invention.

FIG. 2 illustrates an alternative embodiment in which a magnetic field detector 200 includes two vertically stacked pancake coils 204 and 214, positioned coaxially around a core 206 on a substrate (not shown in FIG. 2). The substantially planar coils 204 and 214 are shown electrically connected by connection 216. Use of a substantially planar coils simplifies fabrication of a third magnetic field detector (i.e. detector 122 in FIG. 1) oriented substantially orthogonal to a substrate surface and to the first and second magnetic field detector elements (i.e. detectors 102 and 112 in FIG. 1). The fabrication of helical-type coil structures in wafer or MEMS type processes, where the helical-type coils are built around a core that is substantially orthogonal to the substrate surface (such as detector 122 in FIG. 1), can be very time consuming and expensive. For example, if it takes two steps to fabricate the helical-type coil structures around the core structures planar to the substrate surface (i.e. detectors 102 and 112 in FIG. 1), it would equally take two steps to fabricate each individual turn of a multi-turn helical coil (i.e. detector 122 in FIG. 1). By using pancake-type coils, which are co-planar with the substrate surface, the steps needed to fabricate coils 204 and 214 will be about the same as the steps needed to fabricate the coil structure surrounding detectors 102 and 112 in FIG. 1.

As shown in the embodiment illustrated by FIG. 2, core 206 includes first and second electrical contacts 208 and 208', and the coils 204 and 214 includes first and second electrical contacts 210 and 218. The electrical contacts 208 and 208' may each be connected to one of the positive or negative contacts of a source of high frequency alternating current (for example, a high frequency AC power supply not shown in FIG. 2), and the coil first and second electrical contacts 210 and 218 may each be connected to a electrical circuit (not shown in FIG. 2) for measuring the resistive component of the electrical impedance of the core 206. One skilled in the art will appreciate that detectors shown can use more or less than two pancake coils depending on the sensitivity requirements of the detectors.

Figure 3:
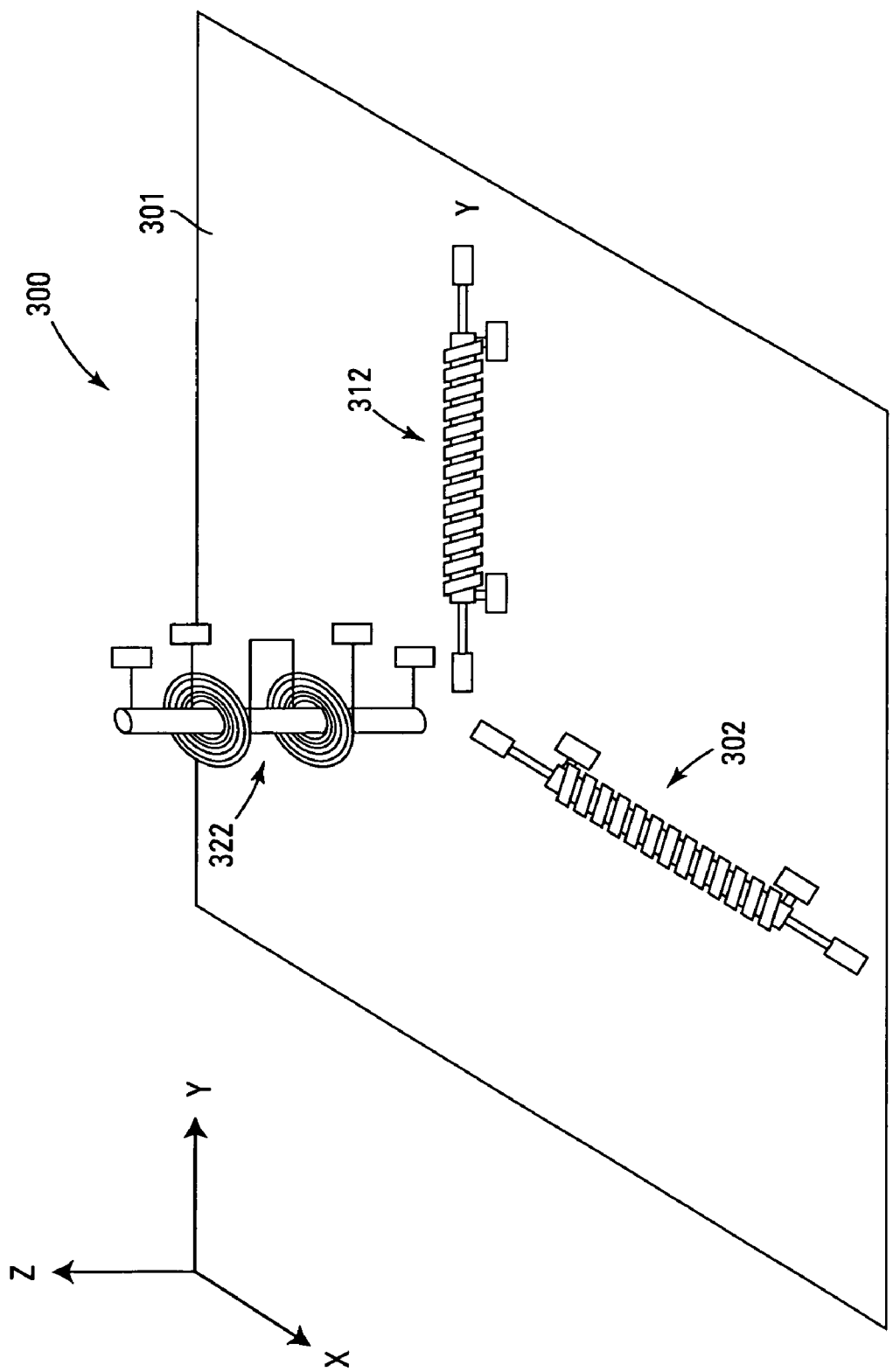
FIG. 3 is a schematic view diagram illustrating an exemplary three axis magnetic MEMS compass using three magnetic field detectors including two GMI magnetic field detectors and a third substantially planar magnetic field detector positioned on a surface of a substrate according to yet another embodiment of the present invention.

FIG. 3 shows an embodiment that includes a detector as described above and shown in FIG. 2. The three axis magnetic MEMS compass 300 may be fabricated using three magnetic field detectors including two GMI magnetic field detectors 302 and 312 and a third GMI magnetic field detector 322 (having pancake-type coils) positioned on a surface of a substrate 301. Although the performance compass 300 may be similar to the compass shown in FIG. 1, the processing (as described above) of compass 300 requires much less time and money.

Figure 4:
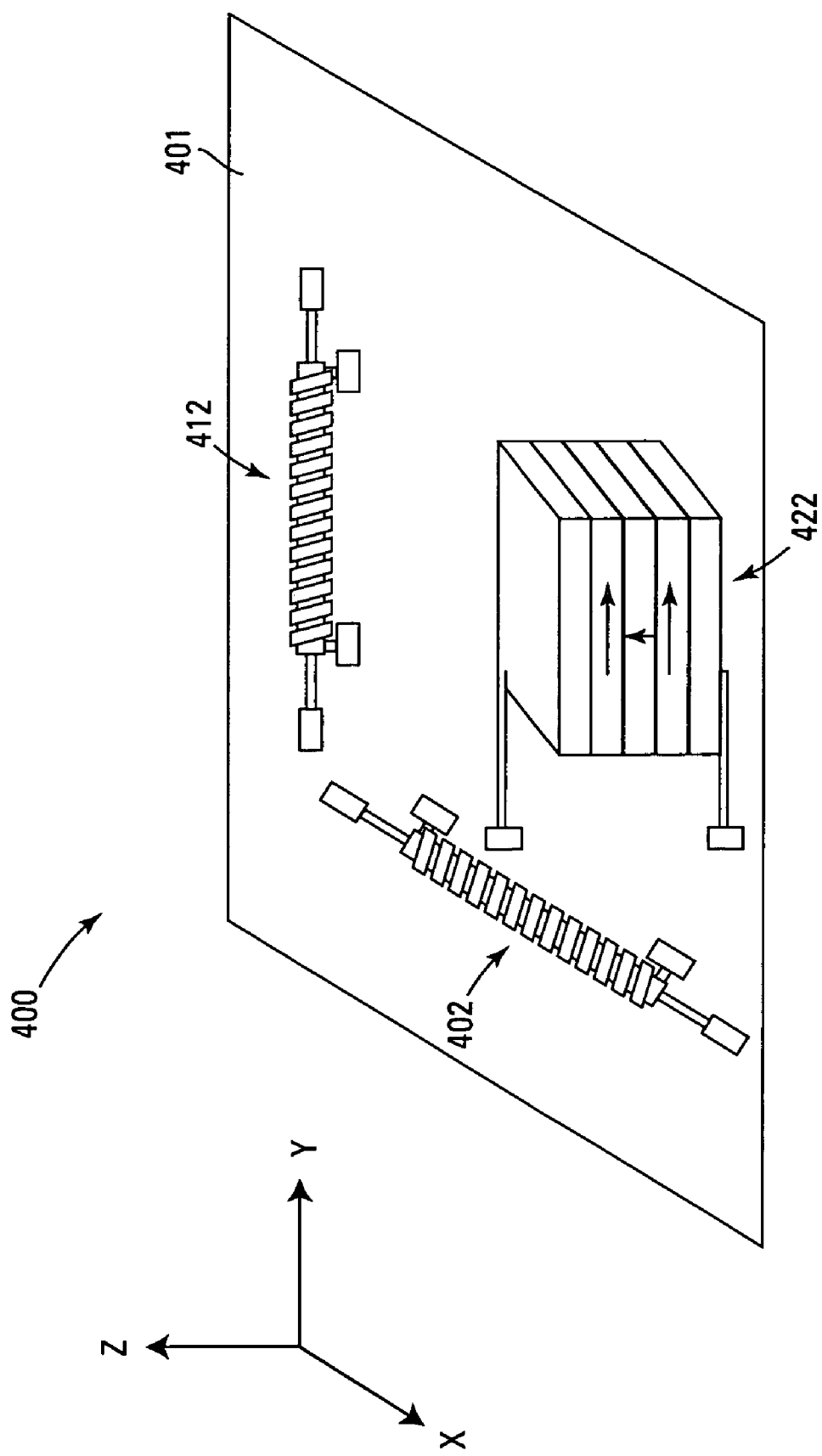
FIG. 4 is a schematic view diagram illustrating an exemplary three-axis magnetic MEMS compass using three magnetic field detectors including two GMI magnetic field detectors and a magnetoelectric (ME) magnetic field detector formed on a surface of a substrate according to yet another embodiment of the present invention.

FIG. 4 shows a three axis magnetic MEMS compass 400 having three magnetic field detectors including two GMI magnetic field detectors and a third thin film magneto-electric (ME) magnetic field detector (i.e. piezo-electric, magneto-resistive, etc.) positioned on a surface of a substrate 401. The embodiment shown in FIG. 3 is substantially similar to the embodiment shown in FIG. 4, except for the use of a magneto-electric magnetic field detector 422 as the detector that is substantially orthogonal to the surface of the substrate. The benefit of implementing a magneto-electric magnetic field detector element 422, similar to the use of pancake coils in detectors 322, is to simplify the fabrication process of the compass 400 as a whole. Detector 422 can be fabricated using known thin film processes along with the GMI detectors, which allows for the entire compass 400 to be built from one wafer or substrate which eliminates the need for a pick and place type fabrication process.

Figure 5A:
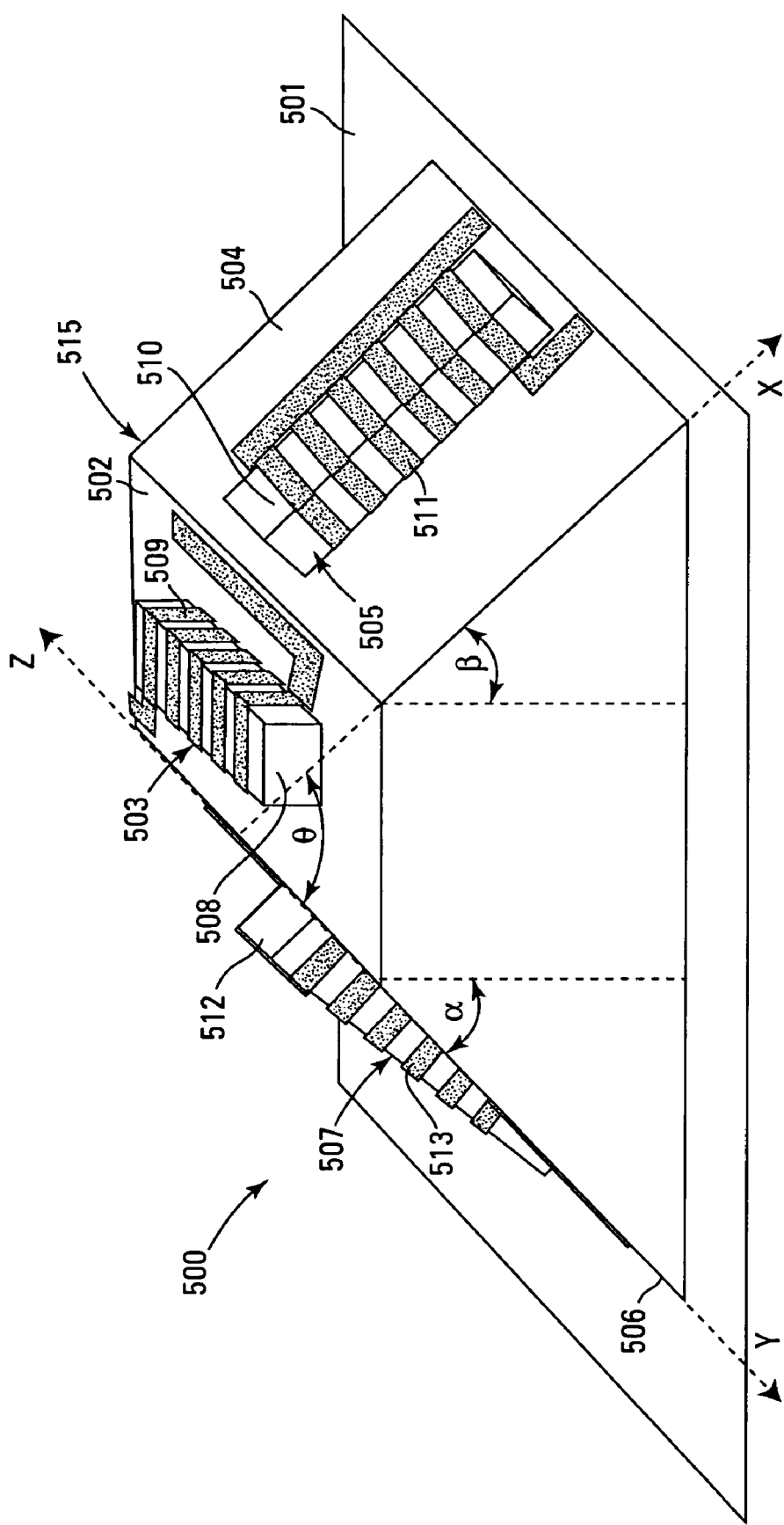
FIG. 5A is a perspective view diagram illustrating an exemplary three axis magnetic MEMS compass using three giant magneto-impedance (GMI) magnetic field detectors positioned on surfaces of a structure according to an additional embodiment of the present invention.

FIG. 5A illustrates an exemplary three axis magnetic MEMS compass 500 having three GMI magnetic field detectors 503, 505 and 507 positioned on surfaces planar and sloped surfaces according to an additional embodiment of the present invention. In an embodiment shown in FIG. 5A, an exemplary three axis magnetic MEMS compass 500 has a base 501. Structure 515 is formed on the base 501, the structure 515 having a plurality of side faces 504, each side face defining an acute angle (for example, angles α and β in FIG. 5A) relative to a line drawn normal to the surface 501, and wherein each side face converges to define a plateau surface 502. Preferably, the plateau surface 502 is a substantially planar to the base 501.

In an exemplary embodiment illustrated in FIG. 5A, a first GMI magnetic field detector 503, including coil 509 about a first core 508, may be positioned on the plateau surface 502 and oriented to detect a direction corresponding to a first axial direction (for example, in a z-axis direction in a Cartesian coordinate system as illustrated in FIG. 5A).

A second GMI magnetic field detector 505, including second coil 511 about a second core 510, may be positioned on a side face 504 of structure 515, and oriented to detect a direction corresponding to a second axial direction (for example, in a x-axis direction in a Cartesian coordinate system as illustrated in FIG. 5A). Preferably, the second GMI magnetic field detector 505 is positioned substantially orthogonal to the first GMI magnetic field detector 503.

A third GMI magnetic field detector 507, a third coil 513 about a third core 512, may be positioned on a side face 506 of the structure 515, and oriented to detect a direction corresponding to a third axial direction (for example, in a y-axis direction in a Cartesian coordinate system as illustrated in FIG. 5A). Preferably, the third GMI magnetic field detector 507 may be positioned substantially orthogonal to the first GMI magnetic field detector 503 and the second GMI magnetic field detector 505. Preferably, the angle θ, formed between a line drawn extending from side face 504 and a line drawn extending from side face 506 to intersect at a point defining an apex of the structure 515, is a 90 degree angle (i.e. a right angle) as illustrated in FIG. 5A.

Compass 500 can be fabricated by generally using thin film wafer processes or MEMS processes. As described above, the processing of helical-type coils about a core which is orthogonal to a substrate surface (using wafer or MEMS process steps) can be costly and time consuming. By using sloped surfaces (i.e. 504 and 506) in structure 515, the fabrication of GMI magnetic field detectors 505 and 507 avoids having to process a detector with a core which is orthogonal to a substrate surface, yet provides detectors that are mutually orthogonal. Thus, a three axis compass 500 can be fabricated from a single wafer or substrate, using a thin film wafer or MEMS process that saves time and money. Those skilled in the art will appreciate that detectors other than GMI magnetic detectors can be used, such as magneto-electric or magneto-resistive, without departing from the present invention.

An exemplary sequence of process steps for fabricating an exemplary three axis magnetic MEMS compass according to the embodiment illustrated in FIG. 5A will now be described. Certain features, shapes and positions of elements depicted in the figures can be altered or varied without conflicting with or deviating from the scope of the presently disclosed invention.

Figure 5B:
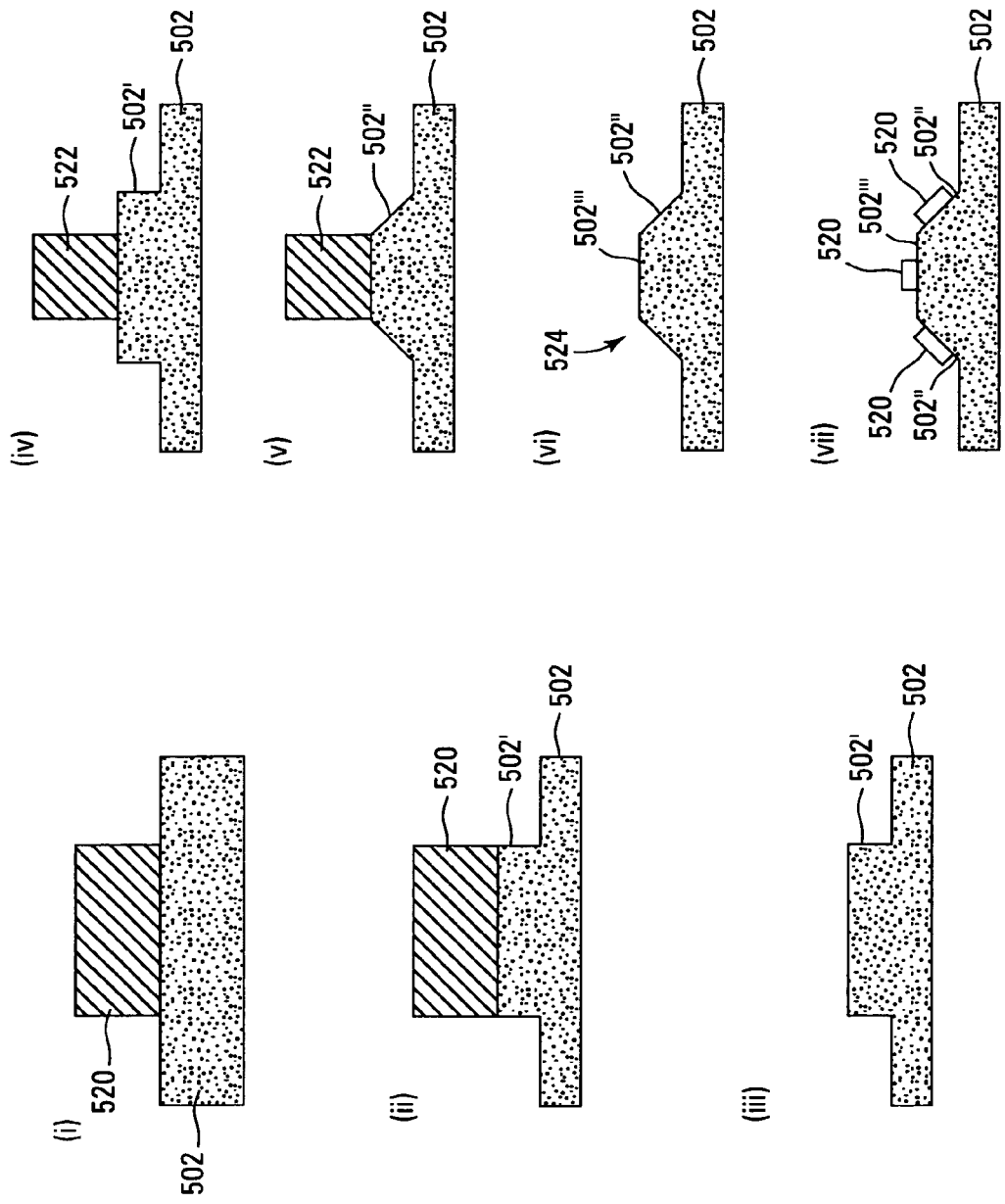
FIG. 5B is a cross-sectional side view diagram illustrating exemplary process steps useful in preparing the structure according to the embodiment illustrated in FIG. 5A.

FIG. 5B illustrates an exemplary processing sequence useful in preparing a wafer or substrate having a structure 524, the processing sequence including the steps of:

(i) depositing (e.g. by spin coating) a first protective mask layer 520 (e.g. a photoresist) overlaying a substrate or base 502 (e.g. a wafer);

(ii) removing (e.g. by selective wet chemical etching) a portion of the substrate 502 not protected by the first protective mask layer 520 to form a step 502';

(iii) removing (e.g. by selective wet chemical etching) the first protective mask layer 520 to expose a top surface of the step 502';

(iv) depositing (e.g. by spin coating) a second protective mask layer 522 (e.g. a photoresist) overlaying the top surface of the step 502';

(v) removing (e.g. by milling at an angle) an edge portion of the step 502' not protected by the second protective mask layer 522 to form a plurality of angled side faces 502"; and (vi) removing (e.g. by selective wet chemical etching) the second protective mask layer 522 to reveal a structure 524 having a plateau surface 502''' supported by the plurality of angled side faces 502" formed on the substrate or base 502.

(vii) fabricating (e.g. by known methods) sensors 520 on angled side faces 502" and plateau surface 502''' such that each of the sensors 520 are positioned substantially orthogonal to each other, the sensors 520 are able to detect external fields that are mutually orthogonal along three directions.

In exemplary magnetic MEMS devices according to the present invention, one or more electrical connections are usually provided to allow signal communication to and/or from the magnetic field detectors, and to provide electrical power to the magnetic MEMS device. Typically, the magnetic field detectors are connected to one or more optional electronic circuit elements using one or more circuit traces or vias terminating at one or more end by at least one electrode connected to a source of electrical power (e.g. a power supply, a battery, and the like). Circuit traces or vias may also connect optional electronic circuit elements to the magnetic field sensor, providing a path for communication of electrical signals to and/or from the magnetic field emitter and detectors. In this manner, a magnetic MEMS device having only a single pair of electrodes may provide electrical signal communication and/or electrical power to a plurality of magnetic field sensors on a single substrate or base.

At least one electronic circuit can optionally be disposed on or within the substrate or base, such as a circuit for driving, detecting, controlling, and processing electronic signals. In some embodiments, the electronic circuit is formed on a surface of or within the substrate or base. The electronic circuit preferably is communicably proximate to one or more magnetic field detectors proximate to the substrate or base. More preferably, the electronic circuit is proximate to at least one magnetic field detector proximate to the substrate or base.

In a preferred sensor embodiment, at least one electronic interface circuit is providing on or within the substrate or base for processing sensor data. The electronic circuit preferably includes at least one electronic circuit element selected from a via, an electrode, power source, a pre-amplifier, a modulator, a demodulator, a filter, an analog to digital computer, a digital to analog converter, and a digital signal processor. A transceiver and integrated on-chip antenna can also be integrated on or within the substrate or base for applications requiring communications between a plurality of sensors according to the present invention or between a sensor according to the present invention and a remotely located system for digital signal processing.

However, it will be understood that the first magnetic MEMS sensor may be used to sense a variation in virtually any external magnetic field. For example, the external magnetic field may be generated by a vehicle such as a motor vehicle, aircraft, ship, submarine, or the like, in which case the first magnetic MEMS sensor may act as a proximity sensor or magnetic anomaly detector. In other embodiments, the external magnetic field may be generated by a metal object, in which case the first magnetic MEMS sensor may act as a metal detector. In some embodiments, the first magnetic MEMS metal detecting sensor may act as a mine detector by sensing an external magnetic field generated by a buried or submerged magnetic object such as a land mine or seaborne mine.

Various embodiments of the invention have been described. These and other embodiments are within the scope of the following claims.

The invention claimed is:

1. A magnetic field sensor comprising:
    a substrate having a surface;
    a first magneto-impedance magnetic field detector positioned on the surface;
    a second magneto-impedance magnetic field detector positioned on the surface proximate to the first magneto-impedance magnetic field detector; and
    a third magnetic field detector positioned on the surface proximate to the first and second magneto-impedance magnetic field detectors, the third magnetic field detector being orthogonal to the surface of the substrate,
    wherein each of the first, second and third magnetic field detector is capable of detecting external magnetic fields that are mutually orthogonal along three directions,
    wherein the third magnetic field detector comprises pancake coils or a thin film magneto-electric magnetic field detector.

2. The magnetic field sensor according to claim 1, wherein the third magnetic field detector is selected from the group consisting of a magneto-electric detector, a magneto-resistive detector, a magneto-impedance magnetic field detector, a magneto-strictive detector, a flux guided magneto-resistive detector, a giant magneto-resistive detector, a giant magneto-electric detector, a giant magneto-impedance magnetic field detector or a tunneling giant magneto-resistive detector.

3. The magnetic field sensor according to claim 1, wherein the first and second magneto-impedance magnetic field detectors are oriented substantially orthogonal to each other.

4. The magnetic field sensor according to claim 3, wherein the third magnetic field detector is oriented substantially orthogonal to each of the first and second magneto-impedence magnetic field detectors.

5. The magnetic field sensor according to claim 1, further comprising at least one electronic circuit formed on or within the substrate, wherein the electronic circuit is communicably connected to at least one of the first and second magneto-impedance magnetic field detectors and the third magnetic field detector.

6. The magnetic field sensor according to claim 5, wherein the electronic circuit includes at least one electronic circuit element selected from the group consisting of a via, an electrode, a power source, a pre-amplifier, a modulator, a demodulator, an oscillator, a filter, an analog to digital converter, a digital to analog converter, or a digital signal processor.

7. The magnetic field sensor according to claim 1, wherein the substrate comprises one or more of the group consisting of polysilicon, single crystalline silicon, silicon-germanium, silicon carbide, silicon oxide, silicon dioxide, silicon nitride, silicon oxynitrite, metals, metal alloys, ceramics, or polymers.

8. The magnetic field sensor according to claim 1, wherein the external magnetic field is the earth's magnetic field.

9. The magnetic field sensor according to claim 1, wherein the first and second magneto-impedance magnetic field detectors are magneto-impedance sensors having helical coils.

10. A compass comprising:
a substrate having a first, second, third and fourth surface, wherein the first and second surface are substantially parallel and the third and fourth surface are each sloped relative to the first and second surface;
a first magnetic field detector positioned on the second surface;
a second magnetic field detector positioned on the third surface; and
a third magnetic field detector positioned on the fourth surface proximate to and substantially orthogonal to both the first and second magnetic field detectors,
wherein each of the first, second and third magnetic field detector is capable of detecting external magnetic fields that are mutually orthogonal along three directions.

11. The compass according to claim 10, wherein the third magnetic field detector is selected from the group consisting of a magneto-electric detector, a magneto-resistive detector, a magneto-impedence magnetic field detector, a magneto-strictive detector, a flux guided magneto-resistive detector, a giant magneto-resistive detector, a giant magneto-electric detector, a giant magneto-impedence magnetic field detector or a tunneling giant magneto-resistive detector.

12. The compass according to claim 10, wherein first, second and third magnetic field detectors are each a magneto-impedance magnetic field detector.

13. The compass according to claim 10, wherein first, second and third magnetic field element are each a magneto-electric field element.

14. The compass according to claim 10, further comprising at least one electronic circuit formed on or within the substrate, wherein the electronic circuit is communicably connected to at least one of the first and second magneto-impedence magnetic field detectors and the third magnetic field detector.

15. The compass according to claim 14, wherein the electronic circuit includes at least one electronic circuit element selected from the group consisting of a via, an electrode, a power source, a pre-amplifier, a modulator, a demodulator, an oscillator, a filter, an analog to digital converter, a digital to analog converter, or a digital signal processor.

16. The compass according to claim 10, wherein the substrate comprises one or more of the group consisting of polysilicon, single crystalline silicon, silicon-germanium, silicon carbide, silicon oxide, silicon dioxide, silicon nitride, silicon oxynitrite, metals, metal alloys, ceramics, or polymers.

17. The compass according to claim 10, wherein the external magnetic field is the earth's magnetic field.

18. A three-dimensional compass comprising:
a base having a surface oriented relative to an external magnetic field;
a structure formed on the surface, wherein the structure comprises a plurality of side faces, wherein each side face defines an acute angle relative to line drawn normal to the surface, and wherein each side face converges to an apex defining a generally substantially planar plateau substantially parallel to the surface;
a first magneto-impedence magnetic field detector positioned on the plateau;
a second magneto-impedence magnetic field detector positioned on one of the side faces, wherein the second magneto-impedence magnetic field detector is positioned substantially orthogonal to the first magneto-impedence magnetic field detector; and
a third magnetic field detector positioned on one of the side faces not containing the second magneto-impendence magnetic field detector, wherein the third magnetic field detector is positioned substantially orthogonal to both the first and second magneto-impedence magnetic field detectors,
wherein each of the first, second and third magnetic field detector are capable of detecting external magnetic fields that are mutually orthogonal along three directions.

19. The three-dimensional compass according to claim 18, wherein the third magnetic field detector is selected from the group consisting of a magneto-electric detector, a magneto-resistive detector, a magneto-impedence magnetic field detector, a magneto-strictive detector, a flux guided magneto-resistive detector, a giant magneto-resistive detector, a giant magneto-electric detector, a giant magneto-impedence magnetic field detector or a tunneling giant magneto-resistive detector.

20. The three-dimensional compass according to claim 18, further comprising at least one electronic circuit formed on or within the substrate, wherein the electronic circuit is communicably connected to at least one of the first and second magneto-impedence magnetic field detectors and the third magnetic field detector.

21. The three-dimensional compass according to claim 20, wherein the electronic circuit includes at least one electronic circuit element selected from the group consisting of a via, an electrode, a power source, a pre-amplifier, a modulator, a demodulator, an oscillator, a filter, an analog to digital converter, a digital to analog converter, or a digital signal processor.

22. The three-dimensional compass according to claim 18, wherein the external magnetic field is the earth's magnetic field.

* * * * *